United States Patent [19]
Cooper

[11] 3,825,128
[45] July 23, 1974

[54] SWAY-ARREST SYSTEM

[75] Inventor: George W. Cooper, San Leandro, Calif.

[73] Assignee: Fruehauf Corporation, Detroit, Mich.

[22] Filed: Aug. 23, 1971

[21] Appl. No.: 173,869

[52] U.S. Cl.................... 212/15, 212/11, 212/125
[51] Int. Cl............................................. B66c 17/20
[58] Field of Search .............................. 212/11–15, 212/124, 125, 3; 254/192

[56] References Cited
UNITED STATES PATENTS

| | | | |
|---|---|---|---|
| 1,013,420 | 1/1912 | Miller .............................. | 212/15 X |
| 2,799,403 | 7/1957 | Friedman.......................... | 212/15 X |
| 3,081,883 | 3/1963 | Minty................................ | 212/15 X |
| 3,111,228 | 11/1963 | Anderson.......................... | 212/11 X |
| 3,567,040 | 3/1971 | Thomson ................................ | 212/3 |

FOREIGN PATENTS OR APPLICATIONS

| | | | |
|---|---|---|---|
| 897,303 | 3/1970 | Japan ................................ | 215/15 F |
| 219,138 | 8/1968 | U.S.S.R.............................. | 212/125 |

Primary Examiner—Evon C. Blunk
Assistant Examiner—Johnny D. Cherry
Attorney, Agent, or Firm—Bruce & McCoy

[57] ABSTRACT

A sway-arrest suspension system for a gantry crane, including a trolley having a plurality of sheaves mounted in a pair of movable sheave heads held within the trolley. The sheave heads move over the same set of rails on which the trolley moves and support a load engaging means by reeving which is acted upon by sheaves held in the load engaging means to arrest sway of the load.

7 Claims, 9 Drawing Figures

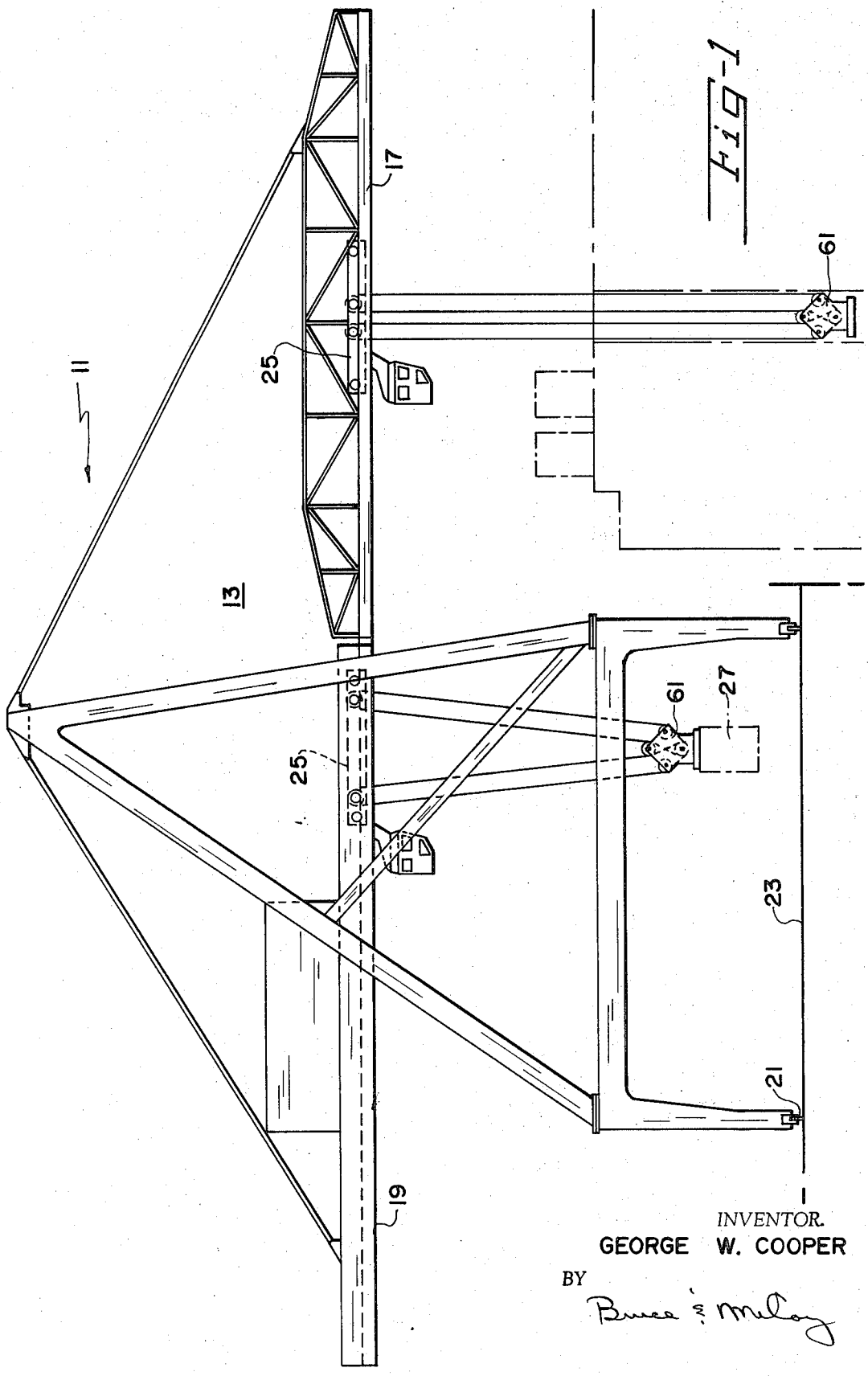

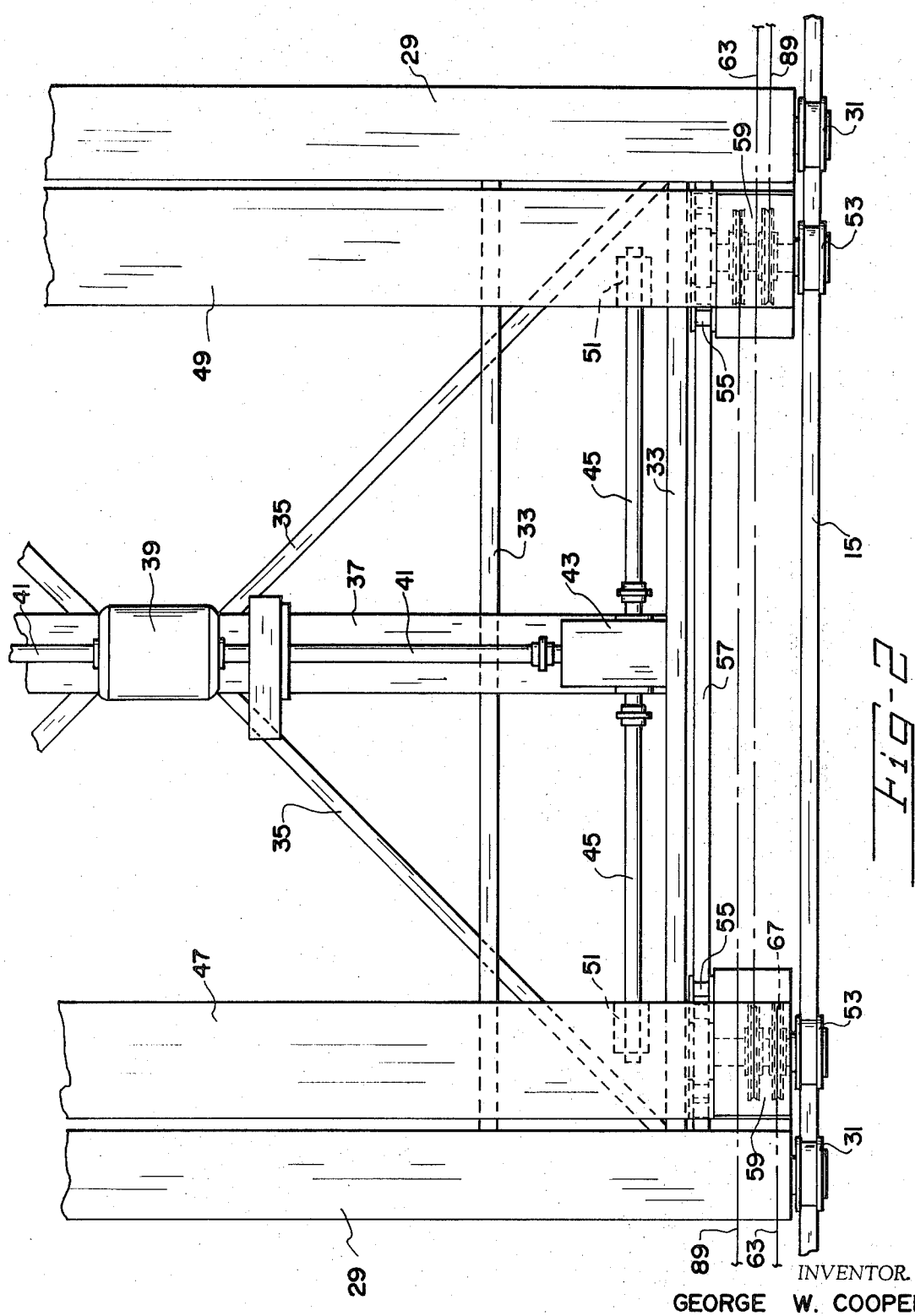

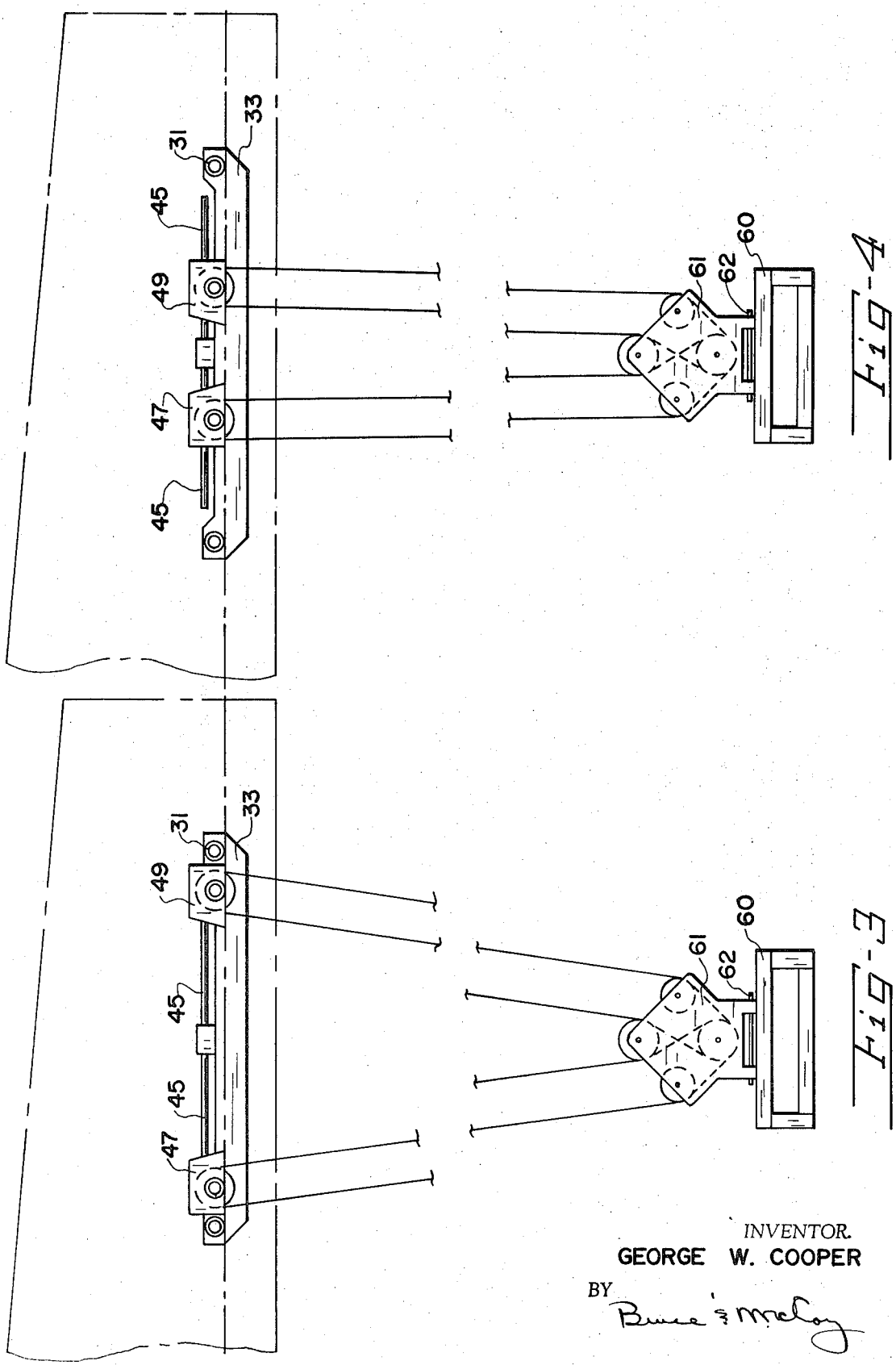

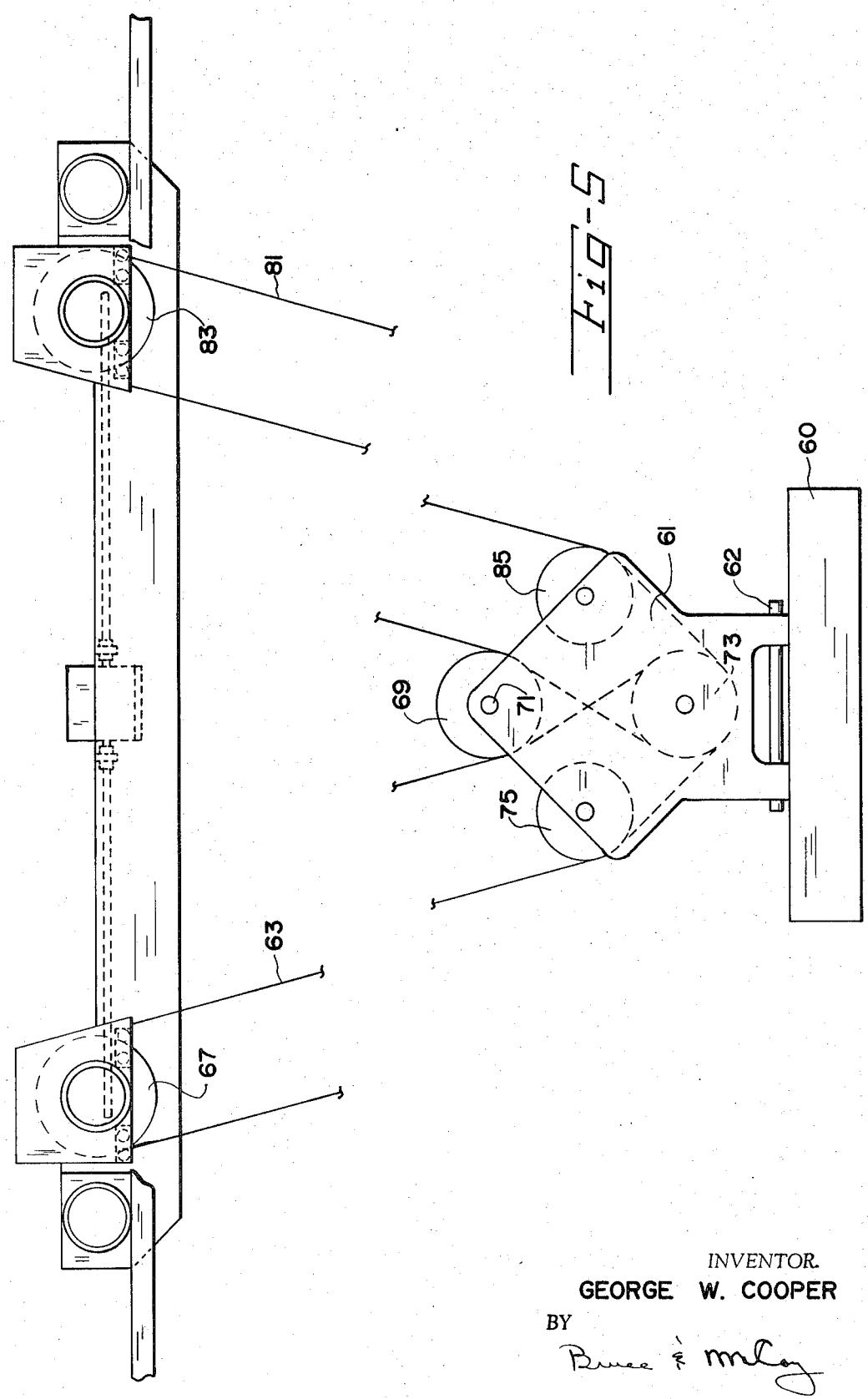

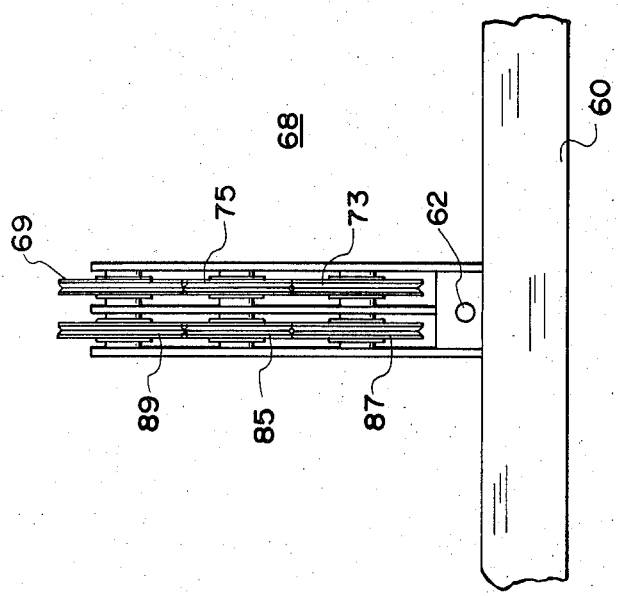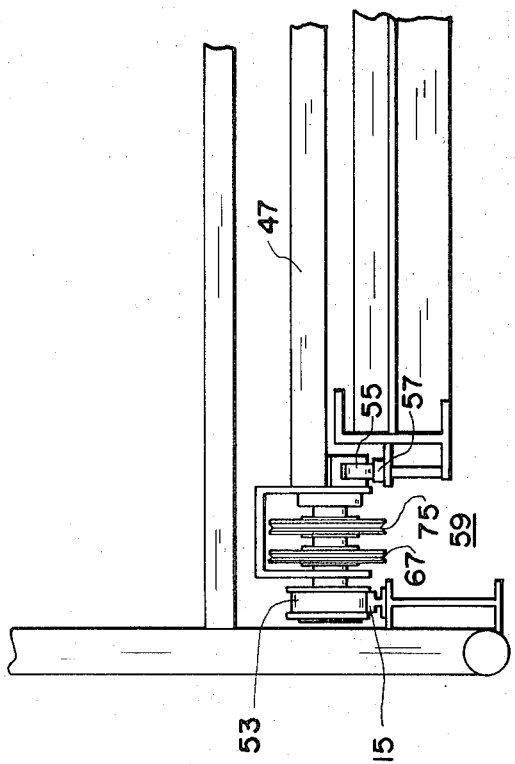

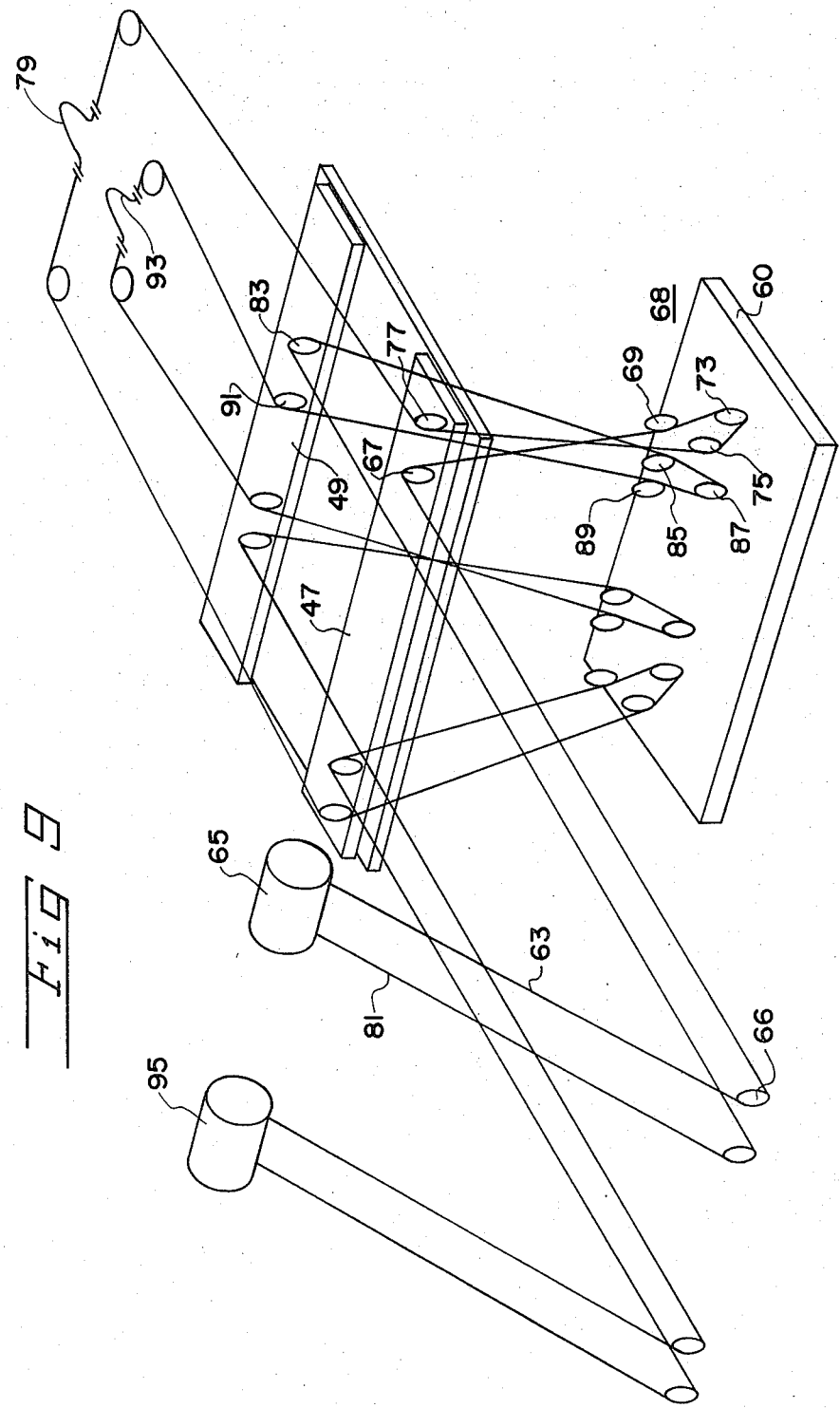

SWAY-ARREST SYSTEM

CROSS-REFERENCE TO RELATED APPLICATIONS

The present invention is a modification of the VARIABLE CENTERS ROPE SUSPENSION SYSTEM set forth in applicant's copending U.S. Pat. application Ser. No. 77,584, filed Oct. 2, 1970.

BACKGROUND OF THE INVENTION

1. Field of the Invention

The present invention relates to anti-sway devices for inhibiting and arresting sway of a suspended load and, more particularly, relates to a combination trolley and sway-arrest load engaging means for use with a gantry crane.

A problem associated with the handling of cargo by large cranes is sway of the load as the load is moved between its pick-up point and its deposition point. Due to the length of the ropes supporting the load and the distance and speed with which the load must be moved to obtain the maximum utilization of the crane, the load experiences pendulum motion due to the combined action of the horizontal acceleration and deceleration forces acting on the inertia of the load.

It is necessary to accurately position the suspended load for deposition and, to effect this, it is very important to be able to stop the horizontal movement of the load and accurately place and release the load in the shortest possible time in order to reduce the cycle time of the crane in effecting the transfer of each cargo container.

2. Description of the Prior Art

Many types of methods and devices have been considered for the arresting or inhibiting of sway or pendulum motion of suspended loads. One such device is disclosed in applicant's co-pending U.S. Pat. application Ser. No. 77,584, which provides a crane structure supporting a gantry having a pair of trolley rails mounted thereon. A pair of trolleys are mounted on the rails and a load-engaging means is suspended from each of the trolleys by reeving depending from sheaves mounted in the trolleys. Means are provided for moving the trolleys apart a selected distance within a frame to angulate the reeving with respect to the spreader, and the reeving supporting the load-engaging means includes a pair of anti-rotation lines to stabilize the load.

The present invention, however, is conceived as a replacement modification system for existing gantry cranes not utilizing the separating trolley design set forth in U.S. Pat. application Ser. No. 77,584. The present system differs from the system set forth in the above-set-forth application in that no center or anti-rotation lines are used for supporting the load and in that a special fixed sheave block design is used at the container headblock or lifting spreader. Furthermore, the trolley of the present invention is a single rigid frame with rolling sheave carriages or mounts held therein and which change position by a mechanical operation.

The system of the present invention is so constructed and designed that it is primarily used to modify existing cranes by replacing the material handling system already erected and in service. However, if considered suitable, an entire crane may be initially designed utilizing the principle of the present invention.

SUMMARY OF THE INVENTION

The present invention is an anti-sway suspension system for an overhead travelling crane. It includes a crane structure supporting a gantry having a pair of trolley rails mounted thereon with a trolley movably mounted on the rails and movable sheave mounts adjustably carried within the trolley frame. The sheave mounts are capable of being displaced with respect to each other a selected distance in the frame. A load-engaging means comprising a pair of fixed sheave nests is suspended from the trolley by reeving, whereby the reeving passing over the fixed sheaves is acted upon to stabilize the load.

OBJECTS OF THE INVENTION

It is therefore an important object of the present invention to provide a sway-arrest system for inhibiting and arresting pendulum motion of a suspended load.

It is another object of the present invention to provide a sway-arrest system for a crane, which permits the load to be moved with great horizontal speed and large acceleration and deceleration rates and quickly and accurately located over the deposition point.

It is a further object of the present invention to provide a sway-arrest system which is adaptable to be mounted on an existing crane to replace the load suspension system thereof.

It is yet another object of the present invention to provide a sway-arrest system for a crane which permits the load to be lowered into a deep shipboard cell without interference of the suspension cables with the cell guides.

It is yet a further object of the present invention to provide a sway-arrest system for a crane which can be operated concurrently with the movement of the load between its pick-up and deposition points.

It is still a further object of the present invention to provide a sway-arrest system capable of replacing existing load suspension and handling systems and which is operable continually during raising and lowering of the load.

And it is yet another object of the present invention to provide a sway-arrest system having a unique headblock or lifting spreader design to stabilize the container against roll along its longitudinal axis.

DESCRIPTION OF THE DRAWINGS

Other objects and advantages of the present invention will become apparent when the sway-arrest system is considered in conjunction with accompanying drawings, wherein:

FIG. 1 is a side elevation of a typical gantry crane employing the present invention;

FIG. 2 is a partial plan view of the trolley and frame arrangement of the present invention;

FIG. 3 is a side elevation of the trolley, showing the sheave mounts in the maximum extended position and the angle of the reeving connected to the 12-sheave quick-change headblock;

FIG. 4 shows the trolley of FIG. 3 with the sheave mounts in the maximum retracted position;

FIG. 5 is an enlarged view similar to FIG. 3 showing the operative elements in greater detail;

FIG. 6 is a partial end elevation of the trolley and frame showing the sheave mounts riding on the gantry rails and the inside roller blocks;

FIG. 7 is a front elevation of one side of the 12-sheave arrangement quick-change headblock showing one of the nests having six sheaves therein;

FIG. 8 is a top plan view of the present invention schematically showing the placement of the sheave nests at each end of the lifting means; and FIG. 9 is a schematic of the reeving of the trolley and lifting means of the present invention.

DESCRIPTION OF THE PREFERRED EMBODIMENT

Reference is made to the drawings for a description of the preferred embodiment of the invention, wherein like reference numerals represent like elements on corresponding views.

The present invention is a rope suspension system for an overhead travelling crane. FIG. 1 shows the crane structure (11) supporting a gantry (13) which has trolley rails (15) mounted on each side thereof and which extend along both the boom portion (17) as well as the fixed portion (19) of the gantry. The crane itself is also mounted on rails (21) whereby it can be moved along a dock (23). The supporting structure of the crane is so arranged that the trolley (25) mounted on the gantry can move from one end of the gantry to the other and carry a suspended load (27), such as a container, thereunder without the load physically interfering with the crane's supporting structure.

The trolley (25) is mounted on the gantry rails (15) and movable therealong. In the preferred embodiment, the trolley includes a rigid frame (29), the right hand side of which is shown in FIG. 2. The trolley is generally rectangular, with wheels (31) mounted at the four corners thereof engaging the gantry rails (15). The frame is shown as having a plurality of longitudinal side beams (33), interconnecting cross braces (35), and a middle cross brace (37). A motor (39) is mounted centrally on the middle cross brace (37) of the frame and includes a pair of drive shafts (41) which rotate differential gear transmissions (43). The gear transmissions drive threaded carriage screws (45) which are engaged in a pair of sheave mount heads (47,49) by threaded flanges (51) secured to the bottom of the sheave mount heads. The carriage screws on opposite sides of the differential housings have opposite threads, whereby, as the motor is turned in one direction or the other, the sheave mount heads will reciprocate and move toward or away from each other, as explained more clearly hereinafter. Limit switches are provided whereby, as the sheave mount heads reach their furthest extension or closest approach, the motor is automatically shut down to prevent any damage to the reciprocating drive system.

Each of the sheave mount heads (47,49) includes a pair of outer wheels (53) engaging the trolley rails (15), and are guided in the trolley frame by a pair of rollers (55) mount within the sheave head, riding over bar tracks (57) fixed to the trolley frame. The trolley is preferably propelled by the rope drive system of the crane.

Each of the rolling sheave mounts includes a pair of sheaves mounted within a housing or a next formed at each end of the sheave mount. In one embodiment of the invention, a lifting spreader quick-change headblock (61) is suspended from the trolley (25) by reeving depending from the pair of sheaves mounted in the nests at each end of the individual sheave mount heads.

The quick-change headblock can be attached to different length lifting spreaders or to a lifting beam (60) by a pin (62) to permit different sizes of cargo containers to be handled, as well as other types of loads. If suitable, the sheaves may also be mounted directly on the lifting spreaders in the same configuration.

One wire rope is reeved from each of the pairs or sets of sheaves contained at each end of the movable sheave mount heads and passes through sheave nests, having fixed sheaves contained therein at each end of the load engaging means. These sheave nests are arranged to stabilize against container roll about its longitudinal axis, which is produced from accelerating or decelerating a suspended container due to displacement of the load center of the container beneath the supporting trolley sheaves. In the present system, as the container tries to roll, the fixed sheave in the nests at each end of the load engaging means acts against the tautness in the load lines, which, in turn, produce compensating forces on the load engaging means to thereby stabilize the container.

In a preferred embodiment of the invention, shown more clearly in FIGS. 3 and 7, and schematically in FIG. 9, a first wire rope (63) is reeved from a first wire rope drum (65) over a sheave (66), outward along the gantry and over a first head sheave (67) in a set of sheaves (59) on the first, or left, sheave mount head (47). The wire rope is then reeved down to a nest of sheaves (68) in the lifting spreader headblock (61), under a first load sheave (69), of a pair of load sheaves held in a nest on the first end of the headblock proximate the first head sheave (67) by a shaft (71) journalled in the headblock. The wire rope is then reeved through a second, or lower, load sheave (73) of a lower pair of load sheaves journalled within the headblock, back up around the periphery of a first center sheave (75) mounted centrally within the nest on the headblock, upward over the other, or second, head sheave (77) of the first set of sheaves (59) and then outward until it is deadened or attached to an adjustable means (79) at the end of the gantry. A second wire rope (81) is reeved outward along the gantry from the same, or first, wire rope drum (65) and over a third head sheave (83), held in the other, or second, sheave mount head (49) at the end thereof corresponding to the first end of the first sheave mount head. This wire rope is then reeved downwardly to the same sheave nest (68), around the outer periphery of a second central sheave (85), through the other load sheave (87) of the lower pair of load sheaves, and back up under the other load sheave (89) of the first pair of load sheaves, held by shaft (71). The wire rope continues back up over a fourth head sheave (91) on the second movable sheave mount head, and outboard to the end of the gantry, where it is adjustably deadened at (93).

The same wire rope receiving arrangement from a second wire rope drum (95) occurs at the other, or opposed, end of the first and second sheave mount heads for supporting a sheave nest (96) in the other, or opposed, end of the headblock.

In the embodiment shown, two wire rope drums (65,95) are utilized for driving the four wire ropes which suspend the spreader. However, one drum could be employed with the two ropes on each side of the center of the spreader headblock being reeved over adjacent sides of the single drum.

It should be noted that the sheave nests (68,96) at each end of the headblock (61) actually comprise two three-sheave sets (69,73,75 and 85,87,89) through which one of the wire ropes (63,81) is reeved. Each of the three-sheave sets lies in the same vertical plane, and all four three-sheave sets contained in the headblock are in parallel planes normal to the lifting spreader.

FIG. 8 shows schematically the arrangement of the sheave nests (68,96) with relation to the lifting spreader (60), to which the nests are both removably attached. This removable connection includes the pin (62) held within a bore formed within the quick-change headblock and a plurality of risers attached to the spreader (FIG. 7).

In operation, the load is picked up under the crane by the spreader (60) connected to the quick-change headblock (61) or by a lifting spreader from a stack of containers or any other suitable pick-up point and moved to its deposition area. If the container is being moved from a shoreside position to onboard a ship, it is picked up with the head mounts spread apart the maximum distance and moved in that condition at relatively high speed outboard on the gantry until it over the deposition point. If this be on the top of the ship, then the sheave mounts can be left in their spread apart position and the load deposited on the ship. However, if the load must be dropped into the hold of a ship within a cell, the load is moved over the deposition point and, after it has stopped swaying, the head mounts are then moved together and the load concurrently lowered into the cell guides from the outboard position shown in FIG. 1 of the drawings. After the container has been unloaded, the reeving is retrieved and pulled up out of the ship. As the reeving is moved inboard, the sheave mounts are moved apart and spaced, and the cycle is begun again when the trolley reach the inboard position over the pick-up point.

The moving apart of the sheave mount heads on the trolley during the lifting and movement of the load angulates the reeving which supports the lifting spreader, inhibiting or arresting sway by placing horizontal force components on the load through the angulated lifting rope and the unique 12-sheave headblock or lifting spreader supported by the crane.

An operator's cab is supported from the end of the frame (29) and contains controls for remotely operating the movement of the trolley along the gantry, as well as for moving the sheave mounts apart any selected distance within the range of operation, and to allow the operator of the crane to handle containers or any other load.

It is therefore an important feature of the invention that a new and novel apparatus and method of arresting sway of a load suspended from a gantry crane is provided. It includes the suspension of a lifting spreader by wire ropes reeved through sheaves mounted on a pair of movable sheave mount heads mounted on a frame disposed on the rails of the gantry. To arrest or inhibit sway of the load suspended thereby, the sheaves are moved apart when lifting a load attached to the spreader to angulate the load. Moreover, the unique arrangement of fixed sheaves within the headblock or lifting spreader attached to the load produces compensating forces between the fixed sheaves and the reeving to stabilize the load.

Obvious modifications and variations of the present invention are possible in light of the above teachings. It is therefore to be understood that within the scope of the appended claims, the invention may be practised otherwise than as specifically described therein.

What is claimed is:

1. A sway-arrest system for arresting pendulum motion of a suspended load relative to the lifting platform of a crane, comprising a trolley capable of being mounted on a pair of rails held in said crane, said trolley having a rigid frame and movable sheave mounts adjustably carried within said frame, actuating means connected to said movable sheave mounts for displacing said sheave mounts with respect to each other in said frame, a load engaging means suspended from said sheave mounts by reeving depending from sheaves carried therein, said load engaging means including a pair of sheave nests mounted at opposed ends of said load engaging means, each of said sheave nests having a plurality of axially and longitudinally spaced sheaves fixed therein, whereby the reeving passing over said fixed sheaves is acted upon by the fixed sheaves to produce compensating forces to stabilize said load.

2. The sway-arrest system of claim 1, wherein each of said sheave nests comprises six sheaves mounted about a center of said nest.

3. The sway-arrest system of claim 2, wherein said six sheaves mounted within each of said nests are arrayed in two sets of three sheaves lying in parallel planes.

4. The sway-arrest system of claim 3, wherein said load engaging means includes a quick-change headblock supporting said sheave nests and a lifting spreader removably secured to said headblock.

5. The sway-arrest system of claim 3, wherein said load engaging means comprises a lifting spreader having said sheave nests mounted directly thereon.

6. A sway-arrest system for arresting pendulum motion of a suspended load relative to the lifting platform of a crane, comprising a trolley capable of being mounted on a pair of rails held in said crane, said trolley having a rigid frame and movable sheave mounts adjustably carried within said frame, actuating means connected to said movable sheave mounts for displacing said sheave mounts with respect to each other in said frame.

a load engaging means suspended from said sheave mounts by reeving depending from sheaves carried therein, said load engaging means including a pair of sheave nests mounted at opposed ends of said load engaging means, each of said sheave nests having six axially and longitudinally spaced sheaves fixed therein and arrayed so as to have two sets of three sheaves lying in parallel planes, whereby the reeving passing over each of said sets of sheaves is acted upon by the fixed sheaves to produce compensating forces to stabilize said load.

7. A method for arresting pendulum motion of a suspended load relative to the lifting platform of a crane, comprising the steps of:

a. suspending said load from said lifting platform by reeving held between a pair of movable sheave mount heads for angulating said load, and b. threading said reeving through a plurality of fixed sheaves supported on load engaging means supporting said load in such a manner that said fixed sheaves act against said reeving to produce compensating forces to stabilize said load.

* * * * *